United States Patent

Moroto et al.

[11] Patent Number: 5,562,565
[45] Date of Patent: Oct. 8, 1996

[54] POWER TRANSMISSION SYSTEM IN A HYBRID VEHICLE

[75] Inventors: Shuzo Moroto; Mutsumi Kawamoto; Kozo Yamaguchi; Shigeo Tuzuki; Yoshinori Miyaishi, all of Aichi-ken, Japan

[73] Assignee: Kabushikikaisha Equos Research, Japan

[21] Appl. No.: 136,109

[22] Filed: Oct. 14, 1993

[30] Foreign Application Priority Data

Nov. 27, 1992 [JP] Japan ................................ 4-341732

[51] Int. Cl.⁶ ............................................ B60K 1/02
[52] U.S. Cl. ................... 477/3; 477/8; 475/149; 180/65.6
[58] Field of Search ............... 475/5, 149; 477/2, 477/3, 8, 9, 12; 180/65.2, 65.3, 65.4, 65.6, 65.7

[56] References Cited

U.S. PATENT DOCUMENTS

| | | | |
|---|---|---|---|
| 4,042,056 | 8/1977 | Horwinski | 180/65.2 |
| 4,533,011 | 8/1985 | Heidemeyer et al. | 180/65.2 |
| 4,815,334 | 3/1989 | Lexen | 74/661 |
| 5,098,351 | 3/1992 | Kobayashi | 475/249 X |
| 5,269,730 | 12/1993 | Hirota | 475/150 |
| 5,285,111 | 2/1994 | Sherman | 477/3 X |
| 5,343,970 | 9/1994 | Severinsky | 475/5 X |
| 5,415,603 | 5/1995 | Tuzuki et al. | 477/5 |
| 5,427,196 | 6/1995 | Yamaguchi et al. | 180/65.2 |

FOREIGN PATENT DOCUMENTS 59-204402  6/1983  Japan.

Primary Examiner—Charles A. Marmor
Assistant Examiner—Peter Kwon
Attorney, Agent, or Firm—Lorusso & Loud

[57] ABSTRACT

A power transmission system in a hybrid vehicle uses the power developed by an electric motor for directly rotating driving wheels, without power loss in a torque convertor connected to an engine. When the vehicle travels by the power of the engine, an input clutch 7 is engaged so that rotation of an engine output shaft 1a is transmitted to a two-gear shift device 9 via the torque convertor 6, the input clutch 7, and an intermediate shaft 21, whereby driving wheels 33a and 33b are driven by a differential unit 11. While powered by the electric motor, the input clutch 7 is released and the rotation of the electric motor 27 is preferably changed in the shift device 9 before being transmitted to the driving wheels 33a and 33b.

16 Claims, 6 Drawing Sheets

POWER TRANSMISSION SYSTEM IN A HYBRID VEHICLE

BACKGROUND OF THE INVENTION

1. Field of the Invention

This invention is broadly concerned with a hybrid vehicle which has, as a power source, the combination of an internal-combustion engine, such as a gasoline or diesel engine, and an electric motor driven by electrical energy stored in a battery. More particularly, this invention relates to a power transmission system for such a hybrid vehicle including a hydraulic power transmission, such as a torque convertor, for controllably transmitting the engine power to the driving wheels.

2. Description of the Related Art

Vehicles conventionally use an internal-combustion engine, such as a gasoline or diesel engine, as a power source. The internal-combustion engine is known for its capability for continuously providing high power for long distance travel, but is also known for a noise problem and generation of exhaust gases containing pollutants such as NOx and $CO_2$.

In the light of these disadvantages, a vehicle using an electric motor has attracted a great deal of public attention for its potential to prevent noise and air pollution. However, an electric vehicle must carry a heavy battery with a limited electric capacity and does not develop sufficient power for acceleration, high load or high-speed travel. The electric vehicle has the disadvantage that it must be charged several times for long distance travel.

In view of the above-mentioned disadvantages, some so-called hybrid vehicles which use both an internal-combustion engine and an electric motor have been proposed. The known hybrid vehicles may be divided into two types, one being a series type wherein the internal-combustion engine constantly runs to drive a generator which, in turn, generates electricity for the electric motor which powers the vehicle and the other being a parallel type wherein the electric motor and the internal-combustion engine both selectively connect to the driving wheels to power the vehicle.

Japanese Patent Application Laid-open No. 59-204402 discloses a typical hybrid vehicle wherein the outputs of both the internal-combustion engine and the electric motor are transmitted to the driving wheels through an automatic transmission provided with a torque convertor. A one-way clutch is provided intermediate the internal-combustion engine and the electric motor to limit the transmission of power from the internal-combustion engine to the electric motor. In this prior art system, the driving wheels may be driven only by the internal-combustion engine or electric motor or by the combination thereof and the battery may be charged either by means of the internal-combustion engine or by a regenerative braking system.

While a torque convertor facilitates starting and accelerating of the vehicle, it also represents a great power loss for the vehicle. Such a power loss may not be a severe disadvantage when travelling under power of the internal-combustion engine, but this disadvantage becomes more conspicuous when travelling under power of the electric motor, due to the limited energy storage capacity of the battery.

If the internal-combustion engine is provided with a torque converter for transmitting its power to the driving wheels and if the electric motor is adapted to be directly connected to the same driving wheels, the above-mentioned power loss problem may be solved, but the electric motor must then be located intermediate the torque converter and the differential gear unit, necessitating a new concept of design. When an electric motor is the power source, the vehicle must accommodate a bigger electric motor to develop a larger torque without a transmission gear device, thus requiring a larger space to carry the motor and a change of design for the vehicle. Even if a flat-type electric motor is employed to minimize this disadvantage, the mounting must inevitably be altered, which is also costly.

SUMMARY OF THE INVENTION

It is an object of the present invention to provide, in a hybrid vehicle, a power transmission system which comprises a hydraulic power transmission such as a torque convertor and a separate gear shift device to transmit the internal-combustion engine power to the driving wheels through the hydraulic power transmission and the gear shift device and to transmit the electric motor power to same only through the gear shift device to thereby overcome the above-mentioned disadvantages of the conventional hybrid vehicles.

To attain the foregoing object, the present invention provides a power transmission system for a hybrid vehicle which has an internal-combustion engine, a hydraulic power transmission connected to an output shaft of the internal-combustion engine, an input clutch connected to an output shaft of the hydraulic power transmission such that a rotation of the output shaft of the internal-combustion engine is selectively transmitted to an intermediate shaft. The hybrid vehicle also has an electric motor consisting of a magnet stator and a rotor connected to the intermediate shaft. An automatic gear shift device consisting of a speed change gear unit is connected between the intermediate shaft at its input and the driving wheels at its output, with engagement means for effecting a predetermined speed change in the speed change gear unit. A case houses the hydraulic power transmission, the input clutch, the electric motor and the automatic gear shift device. When the hybrid vehicle is moved by the internal-combustion engine, the input clutch is engaged to transmit only output developed by the internal-combustion engine to the driving wheels through the hydraulic power transmission and the automatic gear shift device, and when the hybrid vehicle is moved by the electric motor, the input clutch is disengaged whereby only the output developed by the electric motor is transmitted to the driving wheels, through the automatic gear shift device.

The automatic gear shift device is preferably located in the interior space of the rotor of the electric motor.

The speed change gear unit of the automatic gear shift device could be a planetary gear unit having a ring gear, a carrier with at least one pinion and a sun gear. Incidentally, the engagement means for the automatic gear shift device has a direct clutch for regulating relative movement between the carrier and the sun gear, a brake for interrupting rotation of the sun gear relative to the case to thereby provide an engine brake, and a one-way clutch provided between the sun gear and either the carrier or the case.

The ring gear may be connected to the intermediate axle, the carrier having one pinion and being connected to the driving wheels, with the one-way clutch of the engagement means located between the sun gear and the case.

Alternatively, the carrier may have one pinion and be connected to the intermediate shaft, with the ring gear connected to the driving wheels, and the one-way clutch of the engagement means located between the sun gear and the carrier. Incidentally, the automatic gear shift should have the engagement means and the speed change gear unit in this order between the intermediate shaft and the driving wheels, coaxial with the intermediate shaft. The automatic gear shift device can be located behind the electric motor.

In another alternative, the ring gear may be connected to the intermediate shaft, with the carrier having two pinions and being connected to the driving wheels, with the one-way clutch of the engagement means located between the sun gear and the carrier.

In still another alternative the carrier may have two pinions and be connected to the intermediate shaft, with the ring gear connected to the driving wheels and the one-way clutch of the engagement means located between the sun gear and the case.

The hydraulic power transmission could consist of a pump impeller coupled to the output shaft of the internal-combustion engine, a turbine runner driven by fluid flow created by the pump impeller, and a stator provided mounted to the case via a one-way clutch. Incidentally, the hydraulic power transmission also includes a lockup clutch so that the rotation of the output shaft of the internal-combustion engine can be directly transferred to the input clutch. The input clutch can be a hydraulic wet multiple disk clutch.

The coil of the magnet stator is connected with a battery provided for the electric motor as an energy source so that the electric motor functions as an electric generator when the hybrid vehicle is powered by the internal-combustion engine.

When such a hybrid vehicle is powered by the engine, the input clutch is activated so that the rotation of the engine output shaft is transmitted to the automatic gear shift device through the hydraulic power transmission, the input clutch and the intermediate shaft. The automatic gear shift device is adapted to selectively shift into the first or second gear to transmit a controlled rotation to the driving wheels 33, 36 by effectively using an engagement means such as a clutch, one-way clutch or brake. The engine power is transmitted through a hydraulic power transmission such as a torque convertor, so that the engine may continue to move the vehicle even if it does not have enough torque at a low rpm.

When powered by the electric motor, the input clutch is released to transmit the rotation of the rotor to the driving wheels through the automatic gear shift device. The rotation of the electric motor is not transmitted through the hydraulic power transmission in order to avoid power loss and to provide longer distance travel. The electric motor itself makes the vehicle start and accelerate smoothly without use of a hydraulic power transmission even at a low rpm.

As has been mentioned above, when the hybrid vehicle according to the present invention is powered by the engine, the hydraulic power transmission such as the torque convertor is used for a smooth start and acceleration. However, when powered by the electric motor, the hydraulic power transmission is not used to prevent power loss and to thereby provide longer distance travel.

The rotational speed of the electric motor is properly changed in the automatic gear shift device and transmitted to the driving wheels, so that a larger electric motor is not required.

The hybrid vehicle according to the present invention can use a conventional torque convertor and automatic gear shift device.

Figure 1:
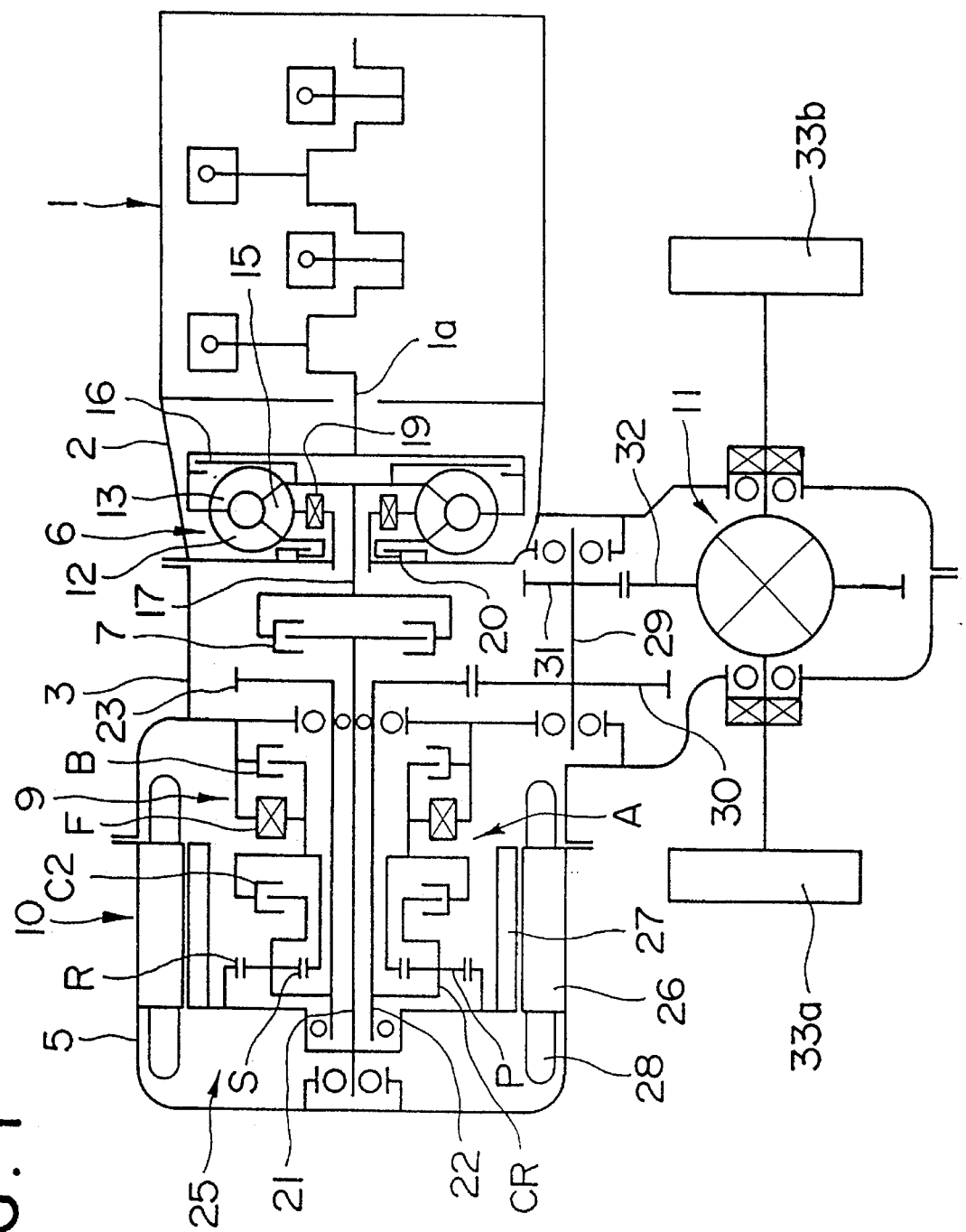
FIG. 1 is a schematic view of a first embodiment of the present invention.

Still other objects and advantages of the present invention will become readily apparent to those skilled in this art from the following detailed description, wherein only the preferred embodiments of the invention are shown and described, simply by way of illustration of the best mode contemplated for carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENT(S)

The preferred embodiments of the present invention will now be described with reference to the drawings.

FIG. 1 depicts the first embodiment according to the present invention wherein an internal-combustion engine (hereinafter referred to as "engine") and an electric motor are provided with an automatic two-gear shift device (U/D= Under Drive type).

The engine can be a gasoline or diesel engine and is mounted transversely under a bonnet. The engine 1 is connected integrally to a convertor housing 2, a transaxle case 3 and a motor case 5, in this order. As can be seen from FIG. 1, a torque convertor 6, an input clutch 7, the two-gear shift device 9 and the electric motor 10 are coaxial with the central axis of an engine output shaft 1a and a differential unit 11 is located thereunder. These devices are preferably housed inside of the cases 2, 3 and 5.

The torque convertor 6 serves as a hydraulic power transmission and is mounted in the convertor housing 2. Torque converter 6 includes a pump impeller 12, a turbine runner 13, a stator 15 and a lock-up clutch 16. The pump impeller 12 is directly connected to the engine output shaft 1a, both output portions of the turbine runner 13 and the lock-up clutch 16 are connected to an input shaft 17 and the stator 15 is supported by a one-way clutch 19 with its inner race fixed to the housing 2. Incidentally, a hydraulic pump 20 is provided intermediate the torque convertor 6 and the input clutch 7 to be driven by the pump impeller 12.

The input clutch 7 is a hydraulic wet multiple disk clutch having an input portion connected to the input shaft 17 and an output portion connected to an intermediate axle 21 extending to the two-gear shift device 9. The intermediate axle 21 rotatably supports a cylindrical output shaft 22 which carries a counterdrive gear 23 located near the input clutch 7.

The automatic two-gear shift device 9 employs a single planetary gear unit 25 wherein a ring gear R is connected to the intermediate shaft 21 and a carrier CR is connected to the output shaft 22 to function as an under-drive unit. There is provided, as an engagement means, a direct clutch C2 between the carrier CR and a sun gear S and a brake B and a one-way clutch F between the sun gear S and the case 3.

The electric motor 10 is preferably a hollow motor such as a brushless DC motor, an induction motor, or a cell winding motor and is received in the motor case 5. The electric motor includes a flat magneto stator 26 which is secured on an inner wall of the motor case 5 and wound with a coil 28. A flat rotor 27 which rotates with the ring gear R of the planetary gear unit 25 and is directly connected to the intermediate shaft 21. As can be understood from the above description of the electric motor 10, the motor 10 provides a large hollow A for receiving the automatic two-gear shift device 9.

At a lower area in the transaxle case 3, there are provided a countershaft 29 having a counterdriven gear 30 meshing with the counterdrive gear 23 on one end thereof and a pinion 31 on the other end and the differential unit 11 having a ring gear 32 which meshes with the pinion 31 to thereby transmit the driving torque to right and left front driving wheels 33a and 33b.

The above-described embodiment of this invention operates in a manner explained in more detail below.

When the vehicle travels at a high speed over a long distance in the suburbs or on a highway, the vehicle is set to travel under power of the engine, that is, the input clutch 7 is engaged to rotate the input shaft 17 and the intermediate axle 21 together. In this condition, the rotation of the engine output shaft 1a is first transmitted to the torque convertor 6 wherein the inputted torque is output, either by means of fluidic drive or by the lock-up clutch 16, from the input shaft 17 to the intermediate shaft 21 through engagement of the input clutch 7. Hence, even if the engine 1 used in this embodiment does not develop high torque when it rotates slowly, the vehicle can start, accelerate, or climb smoothly as expected, due to the torque convertor 6 generating a suitable torque.

The rotation of the intermediate shaft 21 is transmitted to the output shaft 22 through the automatic two-gear shift device 9 wherein first or second gear is selectively chosen in accordance with throttle opening degree and current vehicle speed. When the first gear is selected, the direct clutch C2 is inactivated and the one-way clutch F is in its engagement state, more specifically, the rotation of the intermediate shaft 21 is transmitted to the ring gear R to rotate the pinion P so that the carrier CR rotates slowly, whereby the output shaft 22 connected with the carrier CR develops a decelerated rotation. Incidentally, to have the vehicle coast or slow down by an engine brake, the brake B is activated to stop the sun gear S.

In second gear, the direct clutch C2 is engaged and the sun gear S and the carrier CR thereby rotate together, so that the single planetary gear unit 25 rotates all together to transmit the rotation of the intermediate shaft 21 to the output shaft 22. The rotation of the output shaft 22 is transmitted to the counterdriven gear 30 through the counter drive gear 23 attached thereto and is further transmitted to the differential unit 11 through the ring gear 32 meshing with the pinion 31 concurrently rotating with the counterdriven gear 30. In the differential unit 11, the transmitted rotation is finally converted into respective, different rotations for the right and left front driving wheels 33a and 33b.

The rotation of the engine output shaft 1a is also utilized to generate a predetermined hydraulic pressure in the hydraulic pump 20 fixed to a case for the torque convertor 6. In this state, the circuit for the coil 28 is in an open state to allow the rotor 27 directly connected to the intermediate shaft 21 to rotate freely. Accordingly, as the opened circuit is connected to the battery, the battery is preferably charged by this idle rotation of the rotor 27 or by utilizing regenerative braking.

When the vehicle repeatedly starts and stops at a rather low speed in a city, the vehicle is set to travel by power of the electric motor. In this condition, the input clutch 7 is in an inactive state to disconnect the input shaft 17 from the intermediate shaft 21 and the electric current is sent to the coil 28 to drive the electric motor 10. The rotation of the rotor 27 in the electric motor 10 is transmitted to the output shaft 22 and finally transmitted to the right and left front driving wheels 33a and 33b through the counterdrive gear 23, the counterdriven gear 30, the pinion 31 and the differential unit 11.

The engine 1 is constantly run with minimum exhaust gas and noise to generate a predetermined hydraulic pressure in the hydraulic pump 20. However, the constant rotation of the engine output shaft 1a will not be transmitted to the intermediate shaft 21 if the input clutch 7 is disengaged.

Accordingly, when the vehicle travels only by power of the electric motor and requires a large torque to start, accelerate or climb, the above-mentioned automatic gear shift device 9 will keep the first gear to increase torque for the front driving wheels 33a and 33b. While in high speed travel of the vehicle, the automatic gear shift device 9 is changed to the second gear. Thus, there is no necessity for a large electric motor in the hybrid vehicle to obtain a large torque.

As the vehicle travels under power of the electric motor, the torque convertor 6 is not within the power path, so that the power loss experienced in the conventional hybrid vehicle is avoided to thus obtain a very effective power transmission to the driving wheels, whereby even though the battery can not store therein much electricity, the vehicle can travel for a rather long distance. The electric motor 10 itself functions to smoothly start and accelerate the vehicle with a large torque even at low rpm without utilization of the torque convertor 6.

If necessary, and if the hydraulic pump 20 is provided with a small motor, the engine 1 could be stopped when travelling under power of the electric motor.

Figure 2:
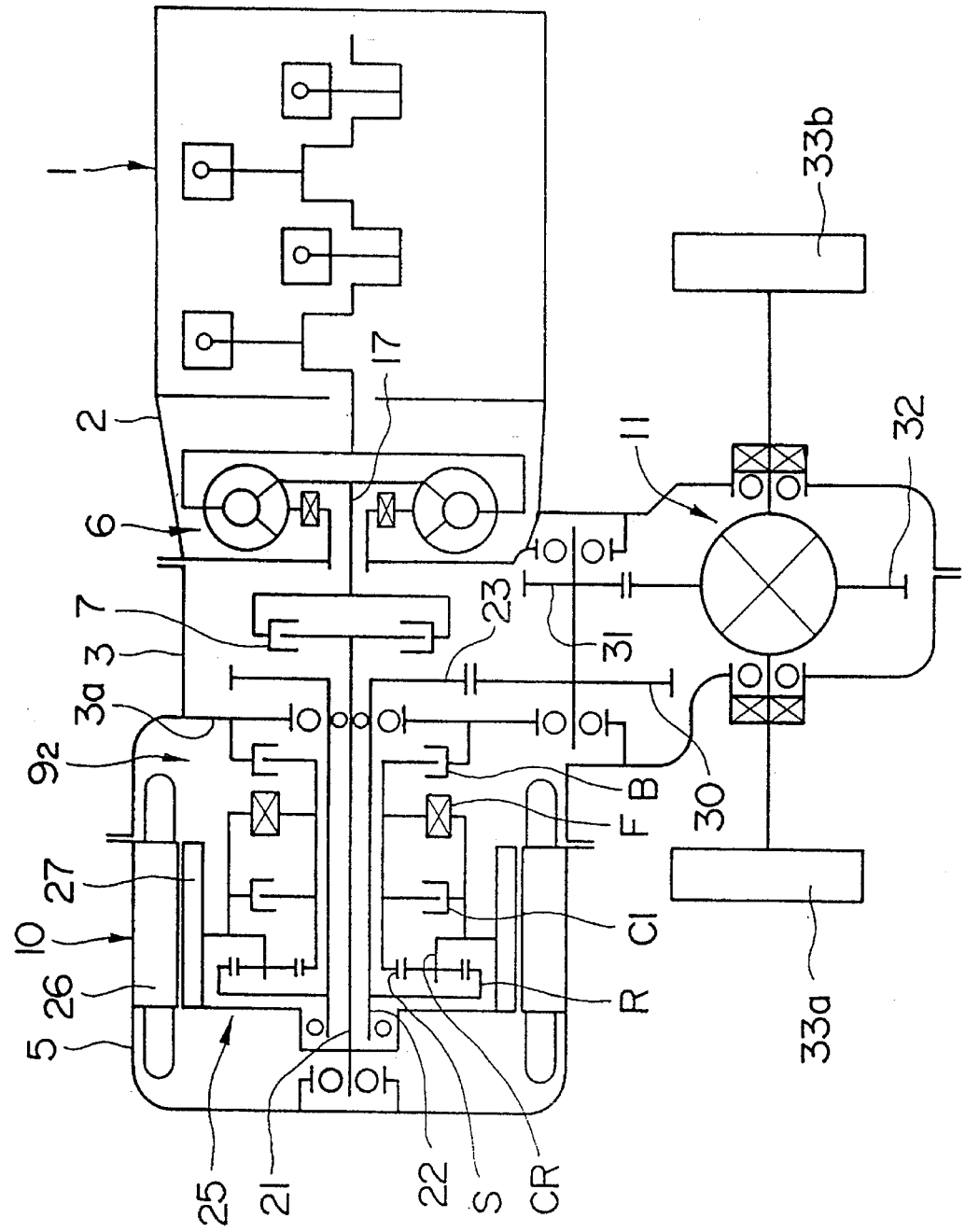
FIG. 2 is a schematic view of a second embodiment of the present invention.

The second embodiment of the present invention will now be explained with reference to FIG. 2. In the description of the following embodiment, the same reference numerals will be used to designate the same or similar components as those in the first embodiment, so that the description can be omitted or simplified.

In this second embodiment, the overall structure is similar to that of the first embodiment except for an automatic gear shift device (O/D=Over Drive), so that the following explanation will only refer thereto. The automatic gear shift device 92 has a single planetary gear unit 25 in which its carrier CR is directly connected to the intermediate shaft 21 and the rotor 27 of the electric motor 10 and its ring gear R is connected to the output shaft 22. A sun gear S is connected to the brake B and is selectively connected to the carrier CR through a direct clutch C1 and a one-way clutch F.

Accordingly, when the automatic gear shift device 92 is in the first gear state, the brake B is released and the rotation of the intermediate shaft 21 by the engine 1 or the rotation of the rotor 27 by the electric motor 10 is transmitted to the ring gear R as well as the sun gear S. The carrier CR and the sun gear S are integrated by the one-way clutch F, so that the carrier CR, the sun gear S and the ring gear R, defining the single planetary gear unit 25, are integrally and concurrently rotated to rotate the output shaft 22. When the vehicle coasts or slows down due to an engine brake, the direct clutch C1 is engaged to integrate the carrier CR and the sun gear S.

When the automatic gear shift device 92 is in the second gear state, the brake B is engaged to stop the sun gear S, so that the rotation of the carrier CR by the intermediate shaft 21 and the rotor 27 makes the ring gear R accelerate as well as the pinion P rotate to thereby accelerate the rotational speed (O/D) of the output shaft 22.

Figure 3:
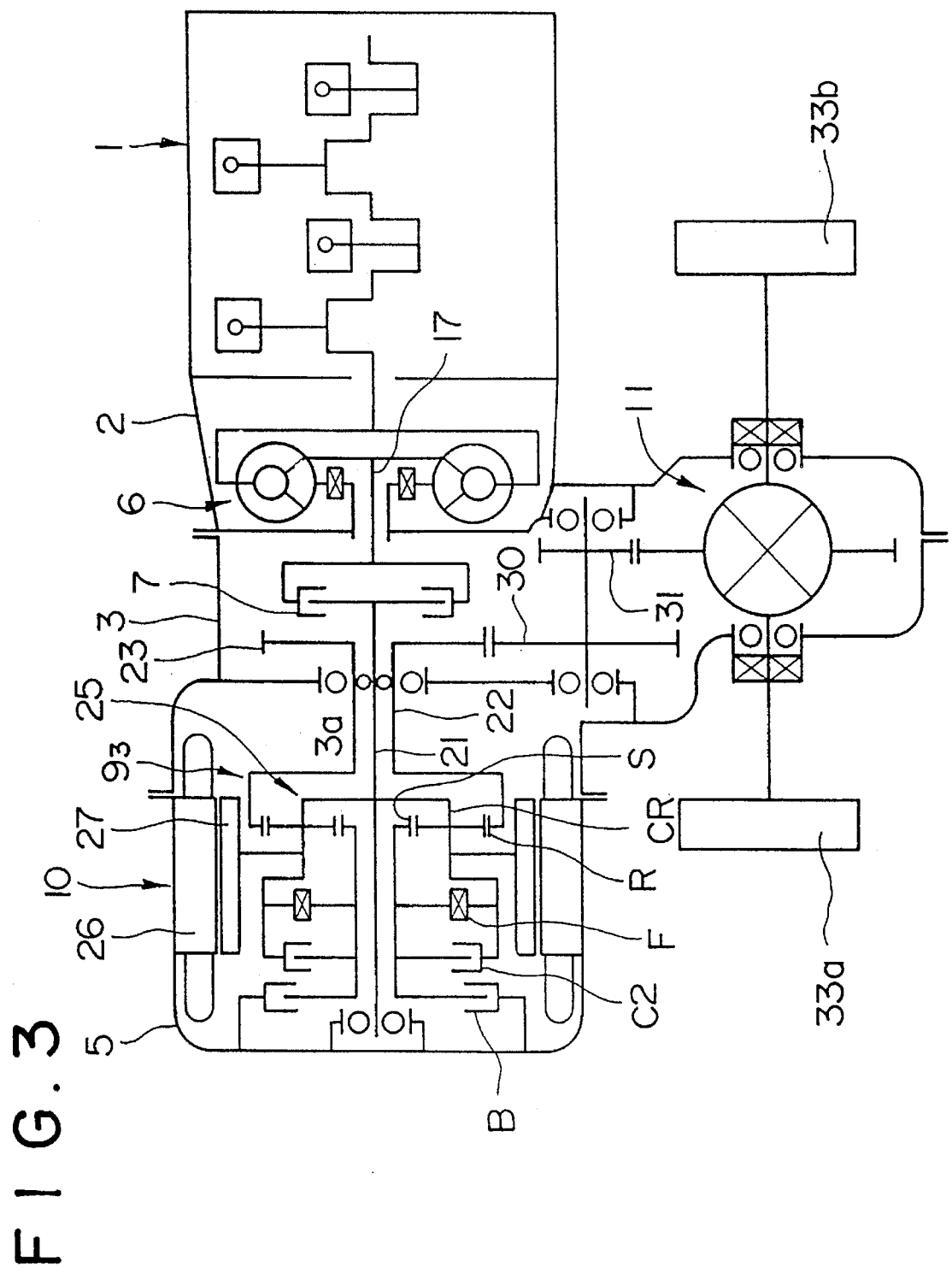
FIG. 3 is a schematic view of a third embodiment of the present invention.

A third embodiment in accordance with the present invention will now be explained with reference to FIG. 3. It can be seen that there is a similar automatic gear shift device as shown in the second embodiment but that the arrangement is different.

In the second embodiment, the automatic gear shift device 92 has its planetary gear unit 25 located remote from the engine 1 and the brake B and clutches C1 and F, as the engagement means are provided near a partition wall 3a of the transaxle case 3. In contrast, in this third embodiment, an automatic gear shift device 93 has its planetary gear unit 25 located near the partition wall 3a of the transaxle case 3 and the brake B and the clutches C2 and F are located remote from the engine 1.

Accordingly, distance from the input clutch 7 or the counterdrive gear 23 to the planetary gear unit 25 is minimized and more particularly the cylindrical output shaft 22 is shortened, whereby the related structure is simplified and effective and stable power transmission can be expected.

Figure 4:
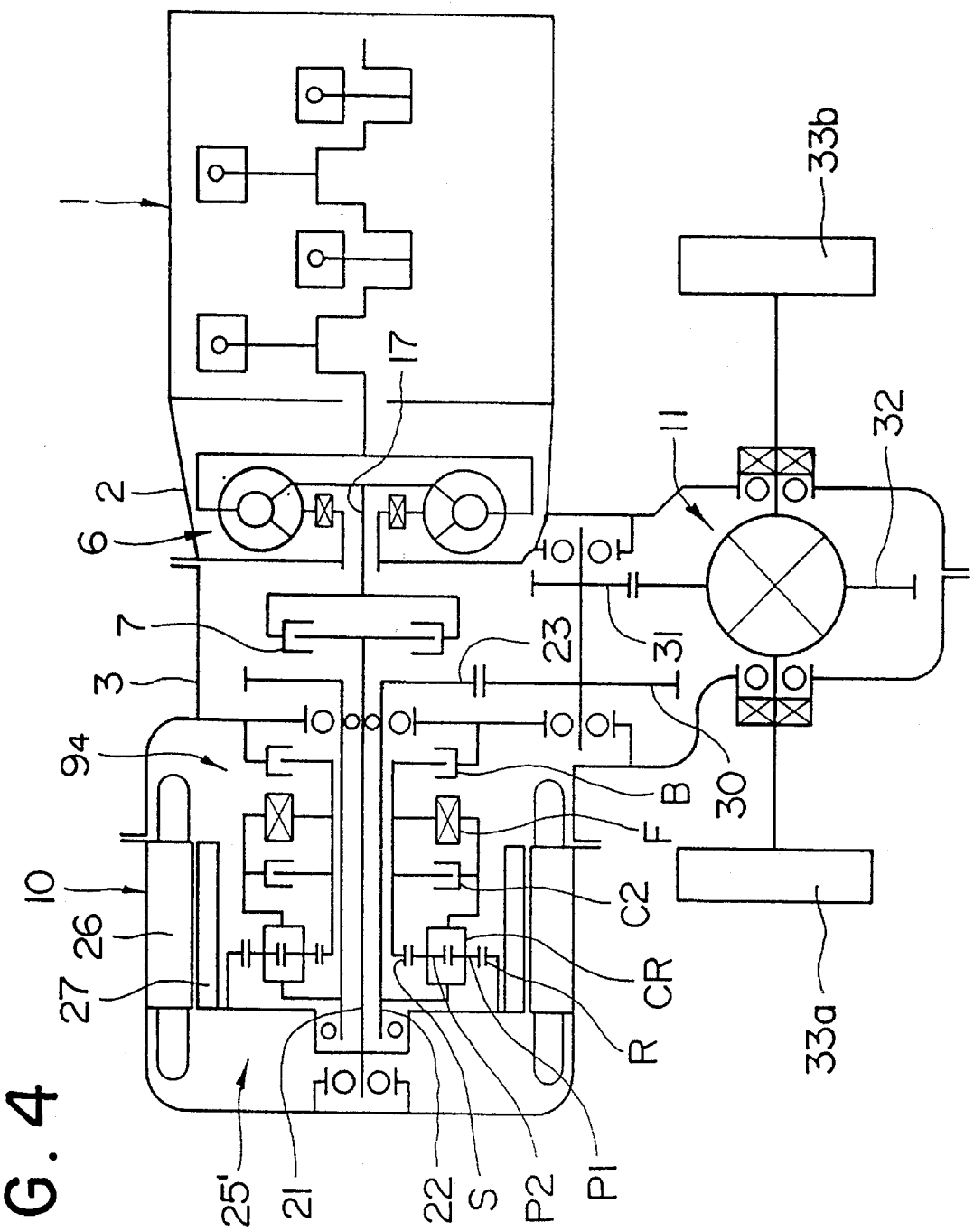
FIG. 4 is a schematic view of a fourth embodiment of the present invention.

FIG. 4 depicts a fourth embodiment of the present invention, wherein an automatic gear shift device 94 (O/D—Over Drive type) includes a so-called dual planetary gear unit.

The dual planetary gear unit 25' in this automatic gear shift device 94 has two pinions P1 and P2 on a carrier CR, the pinion P1 meshing with a ring gear R and the pinion P2 meshing with a sun gear S. The ring gear R is connected to the rotor 27 of the electric motor 10 and also to the intermediate shaft 21, and the carrier CR is connected to the output shaft 22. Incidentally, the sun gear S is connected to a brake B and is adapted to couple with the carrier CR by means of the direct clutch C2 and the one-way clutch F.

Accordingly, when the automatic gear shift device 94 is in the first gear state, the brake B is released and the sun gear S and the carrier CR are integrated by the one-way clutch F (and/or the direct clutch C2). In this condition, the rotation of the intermediate shaft 21 or the rotor 27 is transmitted directly to the output shaft 22 via the ring gear R and the carrier CR of the dual planetary gear unit 25'. To have the vehicle coast or slow down by an engine brake, the direct clutch C2 is engaged to couple the carrier CR with the sun gear S.

With the automatic gear shift device 94 in the second gear state, the brake B is engaged to stop the sun gear S and the one-way clutch F (and the direct clutch C2) is released, so that the rotation of the ring gear R by the intermediate shaft 21 or the rotor 27 makes the carrier CR accelerate, whereby the output shaft 22 connected to the carrier CR develops an accelerated rotation (O/D).

Figure 5:
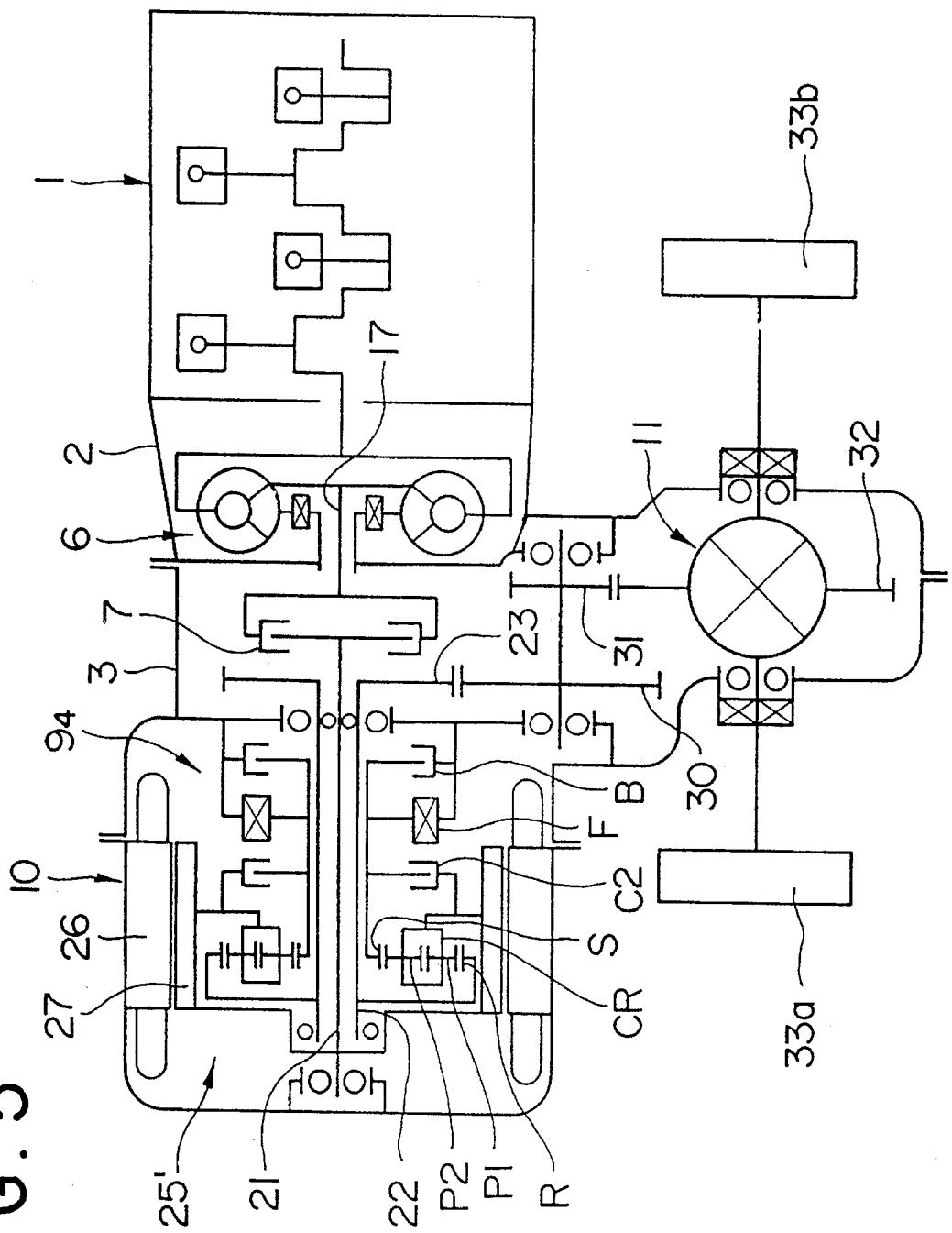
FIG. 5 is a schematic view of a fifth embodiment of the present invention.

A fifth embodiment of the present application will be explained with reference to FIG. 5. An automatic gear shift device 95 in the fifth embodiment employs a dual planetary gear unit which functions as a U/D unit.

In the dual planetary gear unit 25' of the gear shift unit 95 of the this fifth embodiment, its carrier CR is connected to the rotor 27 of the electric motor 10 as well as to the intermediate shaft 21 and its ring gear R is connected to the output shaft 22. The sun gear S is connected to the brake B and its rotation is restricted to one way by the one-way clutch F. The sun gear S and the carrier CR can be coupled by the direct clutch C2.

Accordingly, when the automatic gear shift device 95 is in the first gear state, the direct clutch C2 is disengaged and the sun gear S is prevented from rotation by the one-way clutch F (and/or the brake B), so that the rotation of the intermediate shaft 21 or the rotor 27 is transmitted to the carrier CR to decelerate the rotational speed of the output shaft 22 since the sun gear S is stopped to make the pinions P1 and P2 revolve and thus decelerate the rotational speed of the ring gear R. Incidentally, to have the vehicle coast or slow down by an engine brake, the brake B is engaged to stop the sun gear S.

In the second gear state, the direct clutch C2 is engaged to integrate the carrier CR and the sun gear S and to thus integrate the planetary gear unit 25', so that the rotation of the carrier CR by the intermediate shaft 21 and the rotor 27 is directly transmitted to the output shaft 22 through the integrated planetary gear unit 25'.

Figure 6:
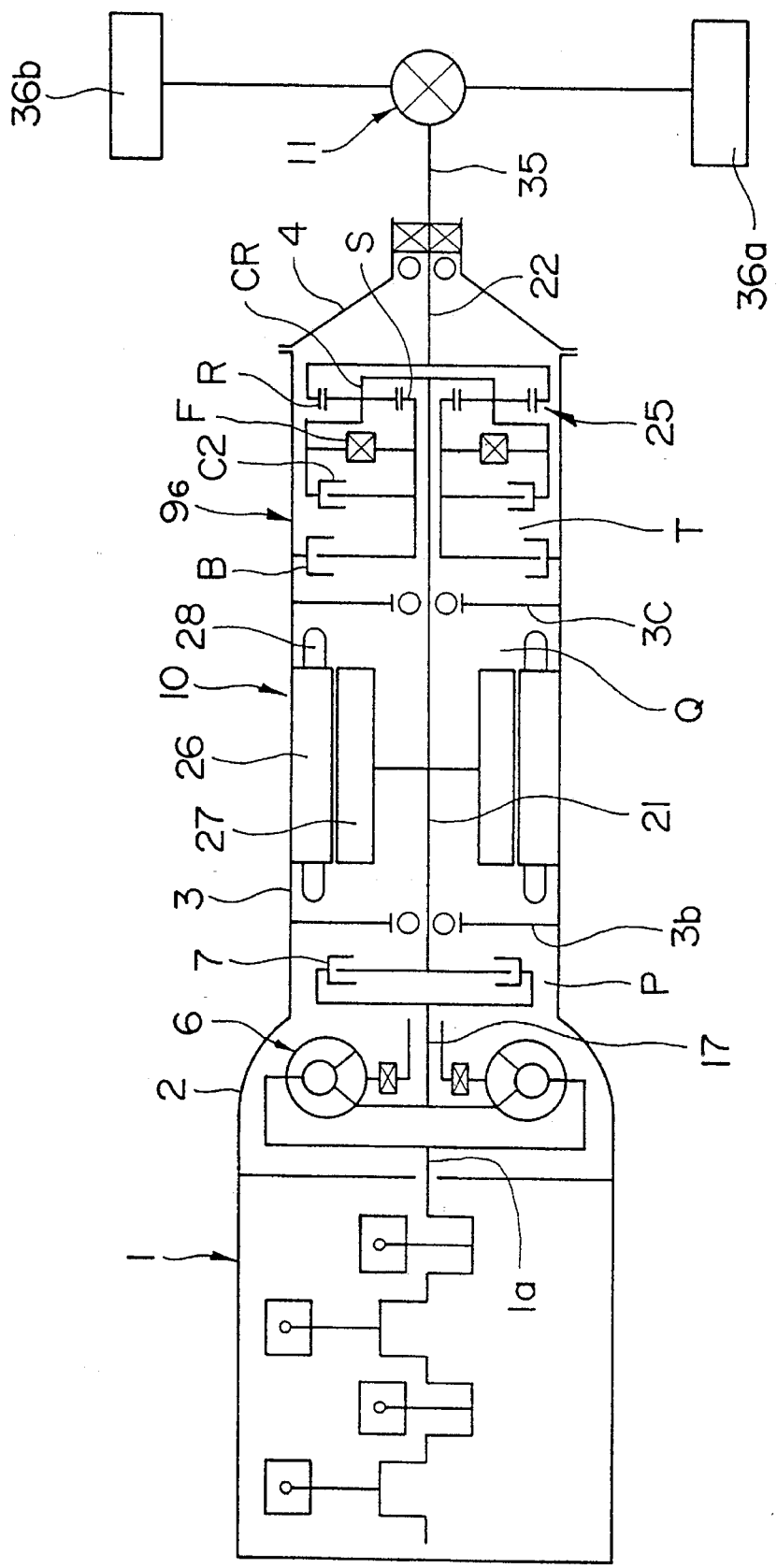
FIG. 6 is a schematic view of a sixth embodiment of the present invention.

FIG. 6, depicts a sixth embodiment in accordance with the present invention. The above mentioned power transmission systems in respective embodiments are utilized in a so-called FF type vehicle wherein the driving source, such as the engine and the electric motor, is received in a front portion of the vehicle so as to drive the front driving wheels. But, in this embodiment, the vehicle carries the driving source at its rear and uses rear driving wheels for travel, and thus is called a "FR type".

As can be seen from the drawing, an engine 1, a convertor housing 2, a transaxle case 3 and a rear cover 4 are integrally and longitudinally arranged under a bonnet of the vehicle. Cases 2 and 3 house a torque convertor 6, an input clutch 7, an electric motor 10 and an automatic gear shift device 96, in the stated order from engine output shaft 1a. Incidentally, the input clutch 7, the electric motor 10 and the automatic gear shift device 96 are separated by partition walls 3b and 3c. The transaxle case 3 is defined by a clutch space P, a motor space Q and a gear space T, the respective spaces being adapted to receive therein the input clutch 7, the electric motor 10 and the automatic gear shift device 96.

An intermediate shaft 21 extends from the input clutch 7 through the partition walls 3b and 3c and carries rotor 27 of the electric motor 10 in the motor space Q. Intermediate shaft 21 is further connected to a carrier CR of a single planetary gear unit 25 in the gear space T. The single planetary gear unit 25 of the automatic gear shift device 96 is adapted to function as an over-drive unit, as in the second embodiment, and more particularly the carrier CR is connected to the intermediate shaft 21 and the ring gear R is connected to the output shaft 22. The sun gear S is connected to the brake B and can be coupled to the carrier CR by means of the direct clutch C2 and the one-way clutch F. The output shaft 22 projects backward from a rear cover 4 which is connected to, via a propeller shaft 35, the differential unit 11 for transmitting driving torque to respective right and left rear driving wheels 36a and 36b.

As has been described, when the vehicle travels by power of the engine, the input clutch 7 is engaged so that the rotation of the engine 1 is transmitted to the intermediate shaft 21 via the torque convertor 6 and the input clutch 7. If the automatic gear shift device is in the first gear state, the planetary gear unit 25 is integrated by means of the one-way clutch F (and/or the direct clutch C2), so that the rotation of the carrier CR is directly transmitted to the ring gear R first and then further transmitted to the differential unit 11 for the right and left rear driving wheels 36a and 36b via the output shaft 22 and the propeller shaft 35. In the second gear state, the rotation of the sun gear S is stopped by the brake B, so that the rotation of the carrier CR by the intermediate shaft 21 makes the output shaft 22 accelerate through the ring gear R, thereby driving the rear right and left driving wheels 36a and 36b through the propeller shaft 35 and the differential unit 11.

If the vehicle travels under power of the electric motor, the input clutch 7 is released to disconnect the torque convertor 6 from the engine 1 and the intermediate shaft 21. The rotation of the electric motor 10 is directly transmitted to the intermediate shaft 21 from its rotor 27 and is further transmitted to the output shaft 22 through the above-described automatic gear shift device 96. The rear right and left driving wheels 36a and 36b are naturally controlled and driven by the differential unit 11.

The automatic gear shift device used in the above mentioned embodiments could be a multi-speed change gear system such as a three-gear or a four-gear type, instead of the two-gear type. The torque convertor could be another type hydraulic power transmission unit such as a fluid coupling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A power transmission system in a hybrid vehicle, comprising:

an internal-combustion engine having an engine output shaft;

a hydraulic power transmission connected to said engine output shaft and having a hydraulic power transmission output shaft:

an input clutch connected to said hydraulic power transmission output shaft for selectively transmitting rotation of the engine output shaft to an intermediate shaft;

an electric motor having a magnet, a stator and a rotor fixed to the intermediate shaft for rotatably driving said intermediate shaft;

an automatic gear shift device comprising a speed change gear unit having an input element connected to the intermediate shaft and an output element connected to driving wheels and engagement means for effecting a predetermined speed change in the speed change gear unit; and a housing in which are mounted said hydraulic power transmission, said input clutch, said electric motor and said automatic gear shift device.

2. The power transmission system in a hybrid vehicle according to claim 1, wherein said rotor has a hollow interior and said automatic gear shift device is located in said hollow interior of the rotor.

3. The power transmission system in a hybrid vehicle according to claim 1, wherein the speed change gear unit of said automatic gear shift device is a planetary gear unit having a ring gear, a carrier with at least one pinion and a sun gear.

4. The power transmission system in a hybrid vehicle according to claim 3, wherein the engagement means of said automatic gear shift device has a direct clutch for regulating relative movement between the carrier and the sun gear, a brake for interrupting rotation of the sun gear relative to said housing to thereby provide an engine brake, and a one-way clutch provided between the sun gear and either the carrier or said housing.

5. The power transmission system in a hybrid vehicle according to claim 4, wherein the ring gear is connected to the intermediate axle, wherein the carrier has one pinion and is connected to the driving wheels, and wherein the one-way clutch of the engagement means is provided between the sun gear and said housing.

6. The power transmission system in a hybrid vehicle according to claim 4, wherein the carrier has one pinion and is connected to the intermediate axle, wherein the ring gear is connected to the driving wheels, and wherein the one-way clutch of the engagement means is provided between the sun gear and the carrier.

7. The power transmission system in a hybrid vehicle according to claim 6, wherein said automatic gear shift has the engagement means and the speed change gear unit in this order between the intermediate axle and the driving wheels, the engagement means and the speed change gear unit being coaxial with the intermediate axle.

8. The power transmission system in a hybrid vehicle according to claim 4, wherein the ring gear is connected to the intermediate axle, wherein the carrier has two pinions and is connected to the driving wheels, and wherein the one-way clutch of the engagement means is provided between the sun gear and the carrier.

9. The power transmission system in a hybrid vehicle according to claim 4, wherein the carrier has two pinions and is connected to the intermediate axle, wherein the ring gear is connected to the driving wheels, and wherein the one-way clutch of the engagement means is provided between the sun gear and said housing.

10. The power transmission system in a hybrid vehicle according to claim 6, wherein said automatic gear shift device is located between said electric motor and said driving wheels.

11. The power transmission system in a hybrid vehicle according to claim 1, wherein said hydraulic power transmission consists of a pump impeller coupled to said engine output shaft, a turbine runner fluidically driven by said pump impeller, and a stator mounted to the housing via a one-way clutch.

12. The power transmission system in a hybrid vehicle according to claim 11, wherein said hydraulic power transmission includes a lockup clutch for directly transmitting the rotation of said engine output shaft to said input clutch.

13. The power transmission system in a hybrid vehicle according to claim 1, wherein said input clutch is a hydraulic wet multiple disk clutch.

14. The power transmission system in a hybrid vehicle according to claim 1, wherein said stator has a coil connected with a battery, provided for said electric motor as an energy source, such that said electric motor functions as an electric generator when the hybrid vehicle is powered by said internal-combustion engine.

15. The power transmission system in a hybrid vehicle according to claim 1, wherein the hydraulic power transmission is torque converter.

16. The power transmission system in a hybrid vehicle according to claim 1, wherein the hydraulic power transmission is fluid coupling.

* * * * *